(12) United States Patent
Parker et al.

(10) Patent No.: US 11,300,661 B2
(45) Date of Patent: Apr. 12, 2022

(54) LANDING ON EMERGENCY OR UNPREPARED LANDING STRIP IN LOW VISIBILITY CONDITION

(71) Applicant: GE Aviation Systems Limited, Cheltenham (GB)

(72) Inventors: Edward Parker, Cheltenham (GB); Stefan Alexander Schwindt, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 192 days.

(21) Appl. No.: 16/437,855

(22) Filed: Jun. 11, 2019

(65) Prior Publication Data
US 2019/0392719 A1    Dec. 26, 2019

(51) Int. Cl.
| | | |
|---|---|---|
| *G08G 5/02* | (2006.01) | |
| *G01C 23/00* | (2006.01) | |
| *G01C 21/00* | (2006.01) | |
| *G01S 7/41* | (2006.01) | |
| *G01S 17/89* | (2020.01) | |

(52) U.S. Cl.
CPC ........... *G01S 7/417* (2013.01); *G01C 21/005* (2013.01); *G01C 23/005* (2013.01); *G08G 5/025* (2013.01); *G01S 17/89* (2013.01)

(58) Field of Classification Search
CPC ......... G08G 5/025; G01S 17/89; G01S 7/417; G01C 23/005; G01C 21/005
See application file for complete search history.

(56) References Cited

U.S. PATENT DOCUMENTS

| | | | |
|---|---|---|---|
| 6,591,171 B1 | 7/2003 | Ammar et al. | |
| 7,689,328 B2 | 3/2010 | Spinelli | |
| 8,521,343 B2 | 8/2013 | Spinelli | |
| 9,257,048 B1 | 2/2016 | Offer et al. | |
| 9,310,222 B1* | 4/2016 | Suiter | G01C 23/005 |
| 9,478,141 B2 | 10/2016 | Revell et al. | |

(Continued)

FOREIGN PATENT DOCUMENTS

| | | |
|---|---|---|
| CN | 101244765 A | 8/2008 |
| CN | 102666280 A | 9/2012 |

(Continued)

OTHER PUBLICATIONS

Extended European search report received for European application No. 19181783.2 dated Nov. 15, 2019, 9 pages.

(Continued)

*Primary Examiner* — Peter D Nolan
*Assistant Examiner* — Demetra R Smith-Stewart
(74) *Attorney, Agent, or Firm* — Amin, Turocy & Watson, LLP

(57) ABSTRACT

Systems, computer-implemented methods and/or computer program products that facilitate landing on emergency or unprepared landing strip in low visibility condition are provided. In one embodiment, a system 100 utilizes a processor 106 that executes computer implemented components stored in a memory 104. A selection component 108 selects candidate spaces from a navigation database or machine vision data for landing an aircraft. A guidance component 110 guides landing the aircraft on a landing strip from among the candidate spaces in low visibility condition.

20 Claims, 9 Drawing Sheets

(56) References Cited

U.S. PATENT DOCUMENTS

| | | |
|---|---|---|
| 9,520,066 B2 | 12/2016 | Spinelli et al. |
| 9,617,011 B2 | 4/2017 | Derenick et al. |
| 2002/0029099 A1* | 3/2002 | Gardner ............ B64D 45/0059 701/3 |
| 2007/0138345 A1* | 6/2007 | Shuster ................ G05D 1/106 244/186 |
| 2008/0023587 A1* | 1/2008 | Head ........................ B64G 1/62 244/158.4 |
| 2013/0035810 A1 | 2/2013 | Spinelli |
| 2013/0041529 A1* | 2/2013 | He ........................ G08G 5/0021 701/17 |
| 2013/0046462 A1* | 2/2013 | Feyereisen ............ G08G 5/025 701/457 |
| 2013/0179011 A1 | 7/2013 | Colby et al. |
| 2014/0343765 A1* | 11/2014 | Suiter ................ G08G 5/0021 701/18 |
| 2014/0354456 A1* | 12/2014 | Gannon ................ G08G 5/025 340/972 |
| 2016/0378121 A1 | 12/2016 | Shue |
| 2017/0278406 A1 | 9/2017 | Akselrod et al. |
| 2017/0308104 A1 | 10/2017 | Eberheim et al. |
| 2018/0148192 A1 | 5/2018 | Haskins et al. |

FOREIGN PATENT DOCUMENTS

| | | | | |
|---|---|---|---|---|
| CN | 103810907 A | 5/2014 | | |
| CN | 104619591 A | 5/2015 | | |
| EP | 2555072 A2 | 2/2013 | | |
| EP | 2 977 976 A2 | 1/2016 | | |
| FR | 2917221 A1 * | 12/2008 | ............ | G08G 5/025 |
| WO | 2016109000 A2 | 7/2016 | | |

OTHER PUBLICATIONS

Combined Search and Examination Report received for GB Patent Application Serial No. GB1810263.2 dated Dec. 24, 2018, 9 pages.
First Office Action received for Chinese Patent Application Serial No. 201910543793.4 dated Jul. 5, 2021, 16 pages.
Communication pursuant to Article 94(3) EPC received for European Patent Application Serial No. EP19181783.2 dated Oct. 26, 2021, 11 pages.
Examination Report received for GB Patent Application Serial No. GB1810263.2 dated Sep. 7, 2021, 3 pages.

* cited by examiner

LANDING ON EMERGENCY OR UNPREPARED LANDING STRIP IN LOW VISIBILITY CONDITION

CROSS-REFERENCE TO RELATED APPLICATIONS

This application claims priority to United Kingdom Application No. 1810263.2, filed on Jun. 22, 2018, and entitled "LANDING ON EMERGENCY OR UNPREPARED LANDING STRIP IN LOW VISIBILITY CONDITION." The entirety of the foregoing listed application is hereby incorporated by reference herein.

TECHNICAL FIELD

The subject disclosure relates to facilitating landing on emergency or unprepared landing strip in low visibility condition.

SUMMARY

The following presents a summary to provide a basic understanding of one or more aspects of the invention. This summary is not intended to identify key or critical elements, or delineate any scope of the particular aspects or any scope of the claims. Its sole purpose is to present concepts in a simplified form as a prelude to the more detailed description that is presented later. In one or more aspects herein, devices, systems, computer-implemented methods, apparatus and/or computer program products that facilitate landing on emergency or unprepared landing strip in low visibility condition are described.

According to one aspect, a system is provided. The system can comprise a memory that stores computer executable components. The system can also comprise a processor, operably coupled to the memory, and that can execute computer executable components stored in the memory. The computer executable components can comprise a selection component that selects candidate spaces from a navigation database or machine vision data for landing an aircraft. The computer executable components can further comprise a guidance component that guides landing the aircraft on a landing strip from among the candidate spaces in low visibility condition.

According to another aspect, a computer-implemented method is provided. The computer-implemented method can comprise selecting, by a system operatively coupled to a processor, candidate spaces from a navigation database or machine vision data for landing an aircraft. The computer-implemented method can further comprise guiding, by the system, landing the aircraft on a landing strip from among the candidate spaces in low visibility condition.

According to another aspect, a computer program product facilitating landing on emergency or unprepared landing strip in low visibility condition is provided. The computer program product can comprise a computer readable storage medium having program instructions embodied therewith. The program instructions can be executable by a processor to cause the processor to select candidate spaces from a navigation database or machine vision data for landing an aircraft. The program instructions can further be executable by a processor to cause the processor to guide landing the aircraft on a landing strip from among the candidate spaces in low visibility condition.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Emergency landing of aircrafts can be high stress situations because pilots have checklists to try to keep an aircraft flying such as performing activities to deal with failing systems and keeping an aircraft functioning. The term "aircraft" or "aircrafts" can mean all types of aircraft including fixed-wing, rotorcraft, lighter-than-air, manned aircraft or unmanned aerial vehicle (UAV). Choosing a landing site especially an emergency, unprepared landing strip in low visibility condition can be both stressful and difficult. One or more embodiments described herein can assist pilots or unmanned aircraft vehicles (UAV) select unprepared landing strips, particularly in emergency situations, and especially for low visibility conditions such as rain, fog, darkness, etc. In low visibility condition, identifying suitable landing strips can be additionally challenging as the low visibility can lead to poor judgement. By receiving guidance for an emergency landing, flight crews can concentrate fully on keeping the aircraft in the air.

Figure 1:
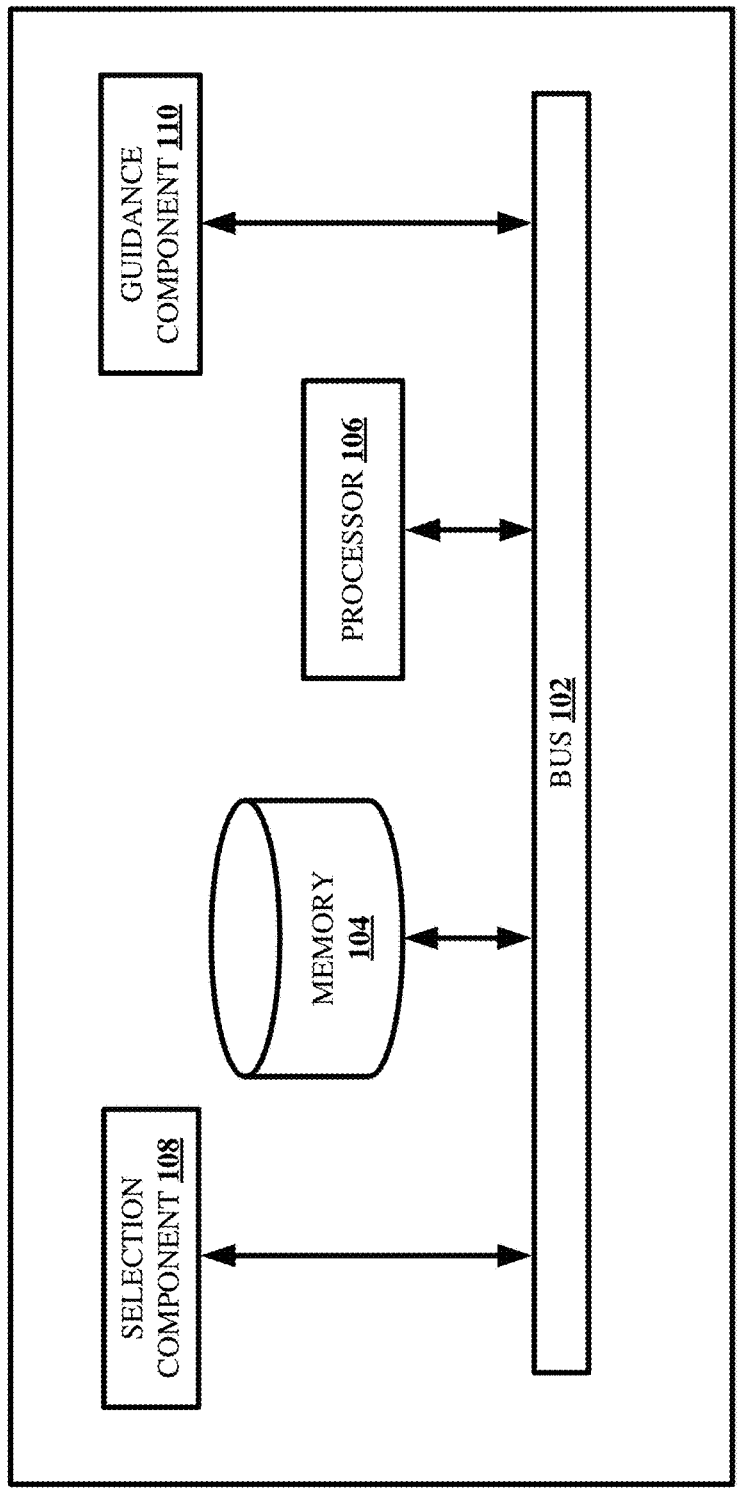
FIG. 1 illustrates a block diagram of an example, non-limiting system facilitating landing on emergency or unprepared landing strip in low visibility condition in accordance with one or more embodiments described herein.

FIG. 1 illustrates a block diagram of an example, non-limiting system 100 facilitating landing on emergency or unprepared landing strip in low visibility condition in accordance with one or more embodiments described herein. Aspects of systems (e.g., system 100 and the like), apparatuses or processes explained in this disclosure can constitute one or more machine-executable components embodied within one or more machines, e.g., embodied in one or more computer readable mediums (or media) associated with one or more machines. Such components, when executed by the one or more machines, e.g., computers, computing devices, etc., can cause the machines to perform the operations described. In various embodiments, the system 100 can be any type of component, machine, device, facility, apparatus, and/or instrument that comprises a processor. In some embodiments, system 100 is capable of effective and/or operative communication with a wired and/or wireless network.

As illustrated in FIG. 1, system 100 can comprise bus 102, memory 104, processor 106, selection component 108 and/or guidance component 110. Bus 102 can provide for interconnection of various components of system 100. Memory 104 and processor 106 can carry out computation and/or storage operations of system 100 as described herein. It is to be appreciated that in some embodiments one or more system components can communicate wirelessly with other components, through a direct wired connection or integrated on a chipset.

In various embodiments, selection component 108 can select candidate spaces from a navigation database or machine vision data for landing an aircraft, e.g., from either or both databases. Navigation database can provide maps of surrounding areas, which can include terrain data (e.g., elevation of hills, buildings, pylons, poles, power or telecommunication lines, etc.) and botanical data (e.g., trees). Machine vision data can provide real-time maps of surrounding areas captured by one or more sensors installed on an aircraft. The sensors can be light detection and ranging (lidar), radio detection and ranging (radar) or optics (e.g., infrared cameras or standard cameras). Machine vision data can capture in real-time whether a mobile object is placed on an open area such as a tractor on an open field or a boat on a river. Navigation database can be augmented with terrain data or botanical data from machine vision data. Selection component 108 can select candidate spaces from only a navigation database if machine vision data is not available. Selection component 108 can also select candidate spaces from only machine vision data if navigation database is not available. If both navigation database and machine vision data are available, selection component 108 can select candidate spaces from a navigation database augmented with machine vision data. A navigation database can be used to search in a wide area and machine vision data can be used to search for areas that are as far as the range of the sensors. For example, a navigation database can provide which area has multiple candidate spaces whereas machine vision data can confirm which candidate spaces are available, e.g., does not have a tractor or truck parked there.

Selection component 108 can search maps from a navigation database or machine vision data for nearest areas that are large enough for landing (e.g., landing strips). Selection component 108 can search whether there is a suitable airport nearby that is within available or remaining performance of the aircraft. For example, if a runway is too short, landing in a field may be less hazardous. If an aircraft is gliding, whether there is enough altitude to glide and land on the suitable runway. Selection component 108 can identify capability of aircraft to reach locations such as runway or selected unprepared landing strips based on available or remaining performance of an aircraft. Selection component 108 can also rank the candidate spaces based on suitability for landing. Suitable landing strip (e.g., suitability for landing) can be long spaces clear of mobile objects (e.g., trucks, boats, picnic table, etc.). Suitability for landing can depend on aircraft speed, aircraft weight, aircraft width, wind direction, surface incline, field condition (e.g., plowing direction, crops on field, etc.) or surface condition. For example, a heavier, higher speed aircraft may need a longer landing strip as it can take longer to come to a stop. The length of a landing strip can also depend on flight parameters, e.g., speed, flying height, etc. Factors such as aircraft speed, aircraft weigh and width can be used to determine the width and length of clear space needed for landing. Wind direction and surface incline can be used to further rank candidate spaces for suitability for landing. Generally, an aircraft should land into the wind so the head wind is blowing into the aircraft, which can shorten the landing distance. Similarly, an aircraft should land into an incline as that can also shorten the landing distance. Other secondary aspects that can be used to rank candidate spaces can include surface conditions, whether wet or dry, or plowing direction. If it has been raining a longer distance may be needed for landing due to the possibility of hydroplaning. As for landing on plowed land, an aircraft should land with the plowing because landing perpendicular to the plowing can cause an aircraft to bounce with the furrow or cause the aircraft to flip. Sensors can also be employed to detect crops on fields. Tall crops can also cause smaller aircrafts to flip.

Selection component 108 can select a number of candidate spaces for landing based on ranking of suitability for landing. Pilots on manned aircrafts can select a landing from the selected candidate landing spaces. Selection component 108 can also automatically select the landing space for either manned aircraft or UAV. For example, selection component 108 can select the top ranked candidate space as the landing strip (e.g., emergency or unprepared landing strip). In an emergency (e.g., at pilot's discretion), a pilot can manually request selection component 108 to search for candidate spaces or select a landing strip. If an aircraft recognized that there is an emergency, selection component 108 can be automatically activated to select candidate spaces or select a landing strip. A UAV generally lands on unprepared landing strips and can use selection component 108 to select a landing strip without an emergency.

As an aircraft prepares to land, guidance component 110 can guide landing the aircraft on a landing strip (e.g., selected emergency or unprepared landing strip) from among the candidate spaces in low visibility condition. Guidance component 110 can guide a pilot or direct a UAV where and how to land based on the selected (e.g., via selection component 108) landing strip. Guidance component 110 can guide a pilot where to land so the pilot can concentrate on flying rather than having to also look out the window and try to figure out where to land while going through checklists to keep the aircraft flying. Guidance component 110 can guide an aircraft (e.g., manned aircraft or UAV) along a flight path to landing by providing the required attitude, glide angle, etc., to follow a trajectory to landing. Guidance component 110 can also utilize one or more sensors that can provide infrared vision or extra lighting for additional guidance through low visibility condition, especially while landing along a landing strip. It is appreciated that in some implementation, guidance component 110 may be able calculate and compensate for the air surface control settings, engine settings, etc., to follow a flight path. It is also appreciated that guidance component 110 may also switch to autopilot mode, for example, if it senses that a pilot is no longer available based on inactivity or empty seat.

Guidance component 110 can retain information of the selected landing strip to guide an aircraft to landing in case the navigation database or machine vision data becomes unavailable especially in an emergency landing. If the navigation database or machine vision data are available, guidance component 110 can continue to utilize those resources. For example, machine vision data may be able to detect additional information such as a truck has pulled up to a field that was previously clear.

Figure 2:
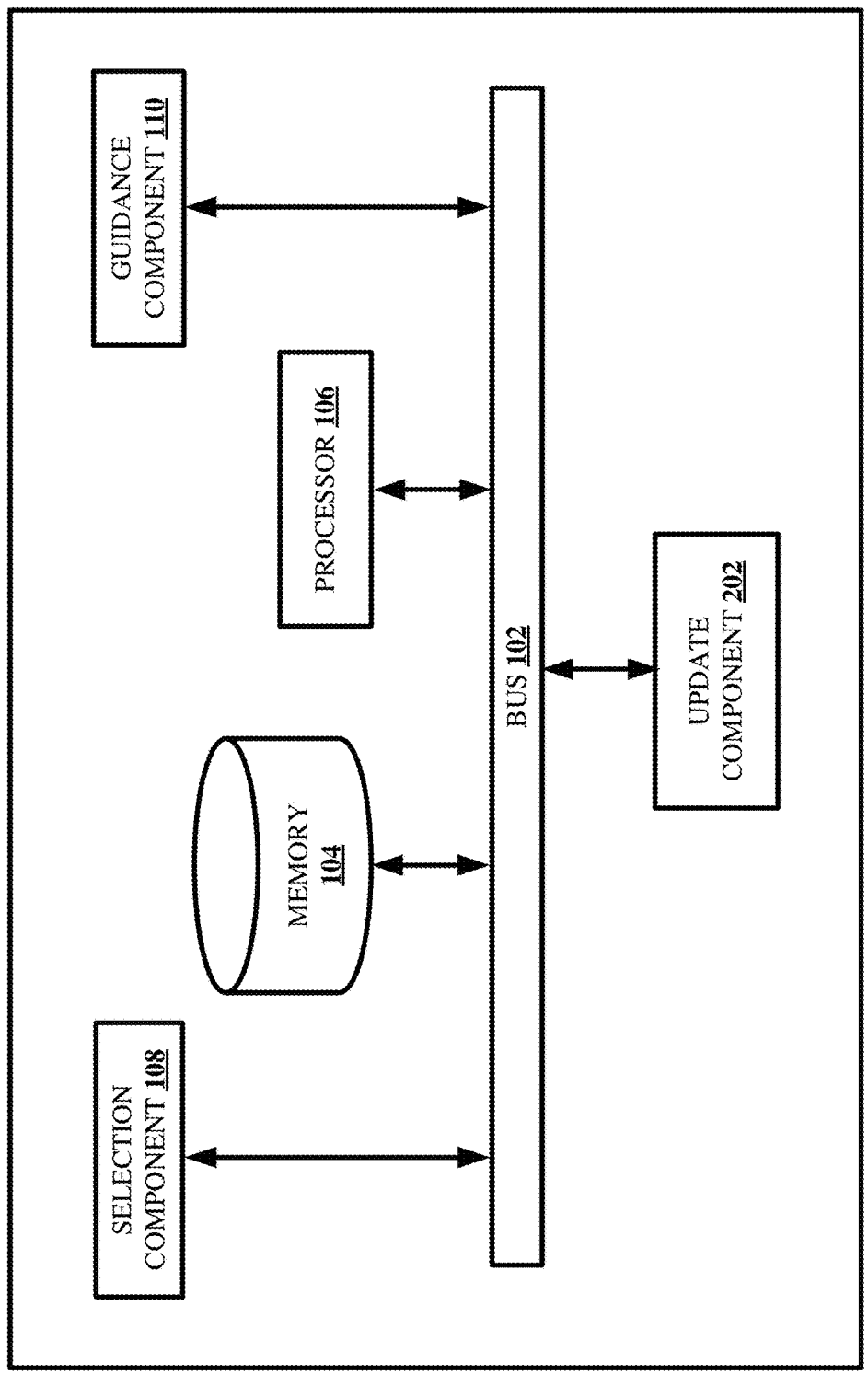
FIG. 2 illustrates a block diagram of an example, non-limiting system facilitating landing on emergency or unprepared landing strip in low visibility condition including an update component in accordance with one or more embodiments described herein.

FIG. 2 illustrates a block diagram of an example, non-limiting system 100 facilitating landing on emergency or unprepared landing strip in low visibility condition including an update component 202 in accordance with one or more embodiments described herein. Repetitive description of like elements employed in other embodiments described herein is omitted for sake of brevity. Update component 202 can receive updates of the navigation database. A navigation database can have aviation related aspects for building a flight plan. Some navigation database can also have terrain data that can include buildings, electrical pylons, telephone poles, etc. Other navigation database can also provide location of every tree in an area. As cities transform and landscape changes, update component 202 can receive an updated navigation database that can be uploaded manually or automatically. For example, machine vision data can be used to also update a navigation database with terrain data, e.g., a new light pole was constructed or a new tree was planted.

Figure 3:
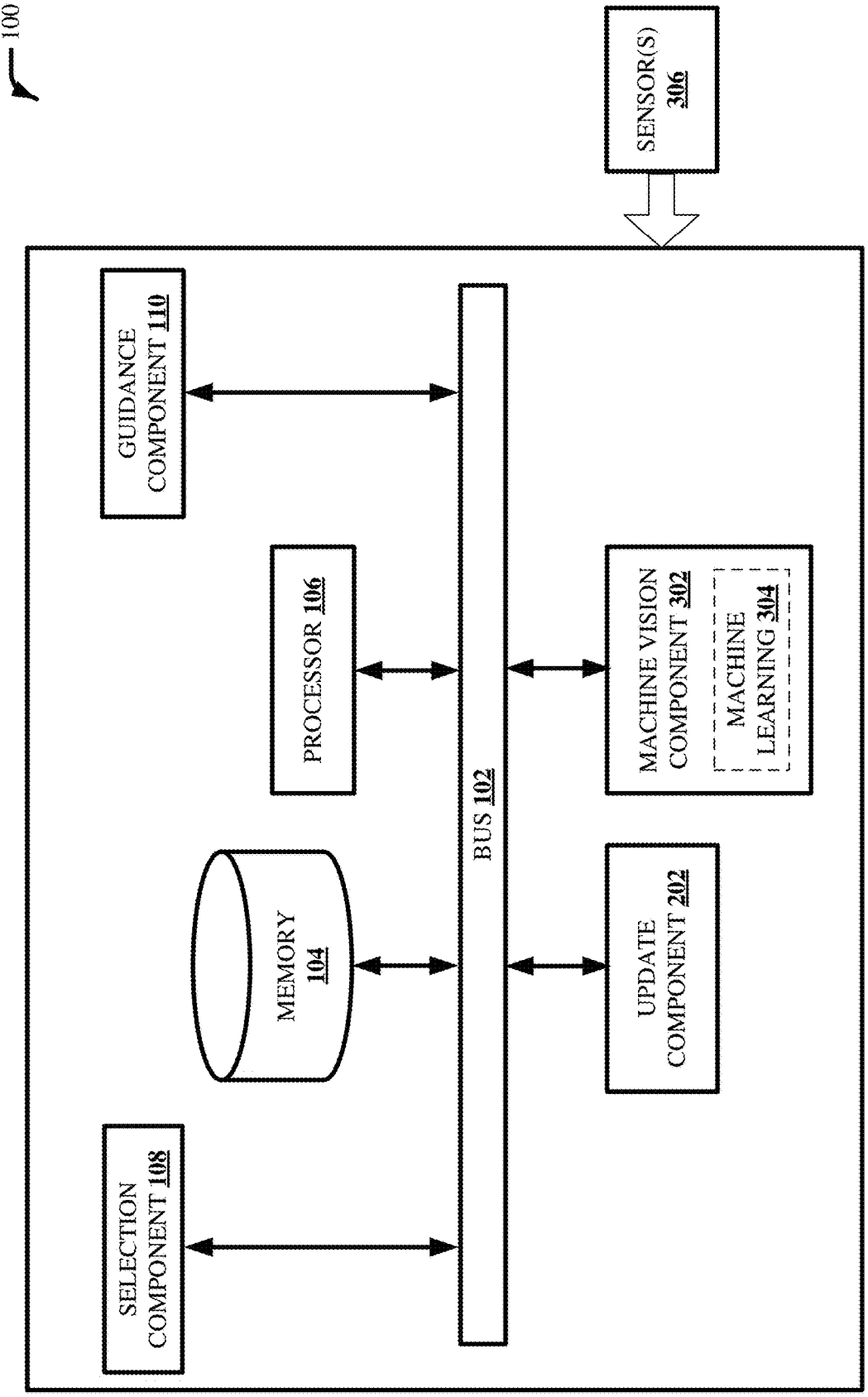
FIG. 3 illustrates a block diagram of an example, non-limiting system facilitating landing on emergency or unprepared landing strip in low visibility condition including a machine vision component in accordance with one or more embodiments described herein.

FIG. 3 illustrates a block diagram of an example, non-limiting system 100 facilitating landing on emergency or unprepared landing strip in low visibility condition including a machine vision component 302 in accordance with one or more embodiments described herein. Repetitive description of like elements employed in other embodiments described herein is omitted for sake of brevity. Machine vision component 302 can produce machine vision data by utilizing machine learning 304 or artificial intelligence to provide candidate spaces for landing. Machine vision component 302 can also employ one or more sensors 306 to scan the candidate spaces for terrain data or botanical data. Sensors 306 can utilize at least one of: lidar, radar or optics (e.g., infrared cameras or standard cameras).

Lidar sensors can illuminate targeted areas with pulsed laser light to detect shape of objects to determine if there are enough clear space for landing especially in low visibility condition. In addition, pulsed laser light from lidar sensors can also provide sufficient lighting to guide (e.g., via guidance component 110) landing in low visibility condition. Lidar sensors can also capture elevations and furrows in a plowed field including height of crops (e.g., tall crops can cause smaller aircrafts to flip). Similarly, radar sensors can also detect plowing direction and anything on a field. Radar sensors can use radio waves to determine direction and distance of targeted areas to detect shape of objects to determine if there are enough clear space for landing especially in low visibility condition. Radar sensors can transmit radio signal and receive reflected radio waves, which can be processed to translate into shapes. Optics can be infrared cameras or standard cameras. Infrared cameras can detect infrared emissions from temperatures of objects to detect shapes of objects to determine if there are enough clear space for landing especially in low visibility condition. Standard cameras may also be used although additional lighting may be required in low visibility condition. It is appreciated that other types of cameras may also be used. For example, stereoscopic cameras can capture three-dimensional images that can be used to identify trees, crops, plowing, whether ground surface is wet or dry, etc.

Based on detection from one or more sensors 306, machine vision component 302 can employ machine learning 304 or artificial intelligence to determine the type of object to produce machine vision data. Machine vision data can be used to update a navigation database. For example, if the object a bridge it would not move very much or at all and that information can be used to update (e.g., via update component 202) a navigation database. In addition, if weather information is accessible (e.g., via internet connection), machine learning 304 or artificial intelligence can also predict whether ground surface is wet or dry.

Selection component 108 can select from machine vision data candidate spaces for landing, if a navigation database is not available. Selection component 108 can also select candidate spaces for landing from a navigation database augmented with machine vison data, if both are available, to obtain real-time update of terrain data or botanical data especially if a mobile object is placed in a generally clear space. Selection component 108 can use a navigation database or machine vision data to identify or select candidate spaces long and wide enough to land an aircraft based on distances between objects in the navigation database or machine vision data. Selection component 108 can also select a landing strip or a pilot of a manned aircraft can select a landing strip.

Guidance component 110 can use machine vision data, produced by machine vision component 302 through images captured by sensors 306 and analyze by machine learning 304 or artificial intelligence, to guide an aircraft to landing. For example, guidance component 110 can guide an aircraft to land while avoiding trees, structures or objects. If the landing strip is a large plowed field, guidance component 110 guide an aircraft to along the plowing direction if that does not cause the aircraft to land with a tail wind. Otherwise, landing with a head wind against the plowing direction should be better.

Some embodiments of the present invention herein can employ artificial intelligence (AI) to facilitate automating one or more features of the present invention. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present invention, components of the present invention can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 4:
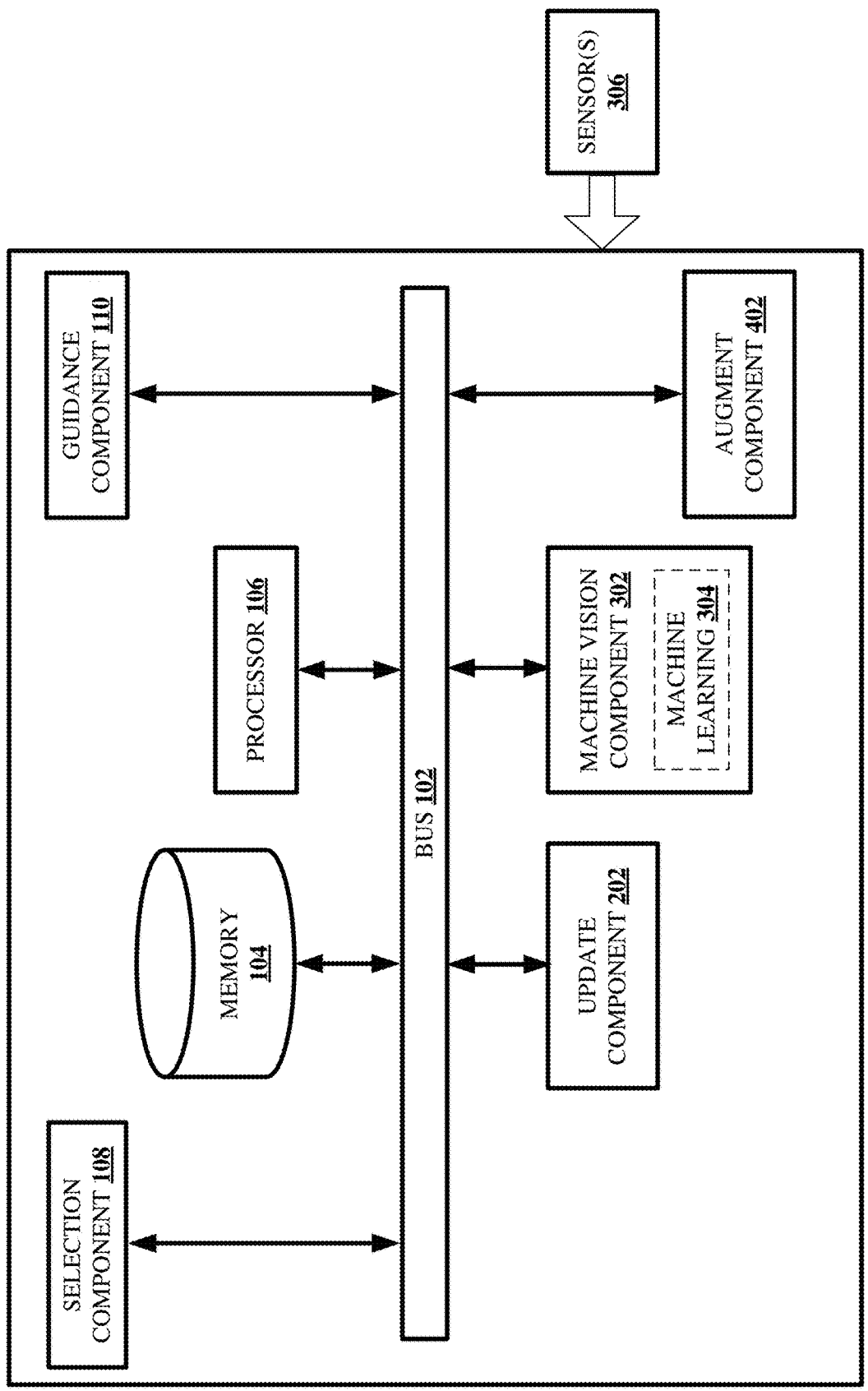
FIG. 4 illustrates a block diagram of an example, non-limiting system facilitating landing on emergency or unprepared landing strip in low visibility condition including an augment component in accordance with one or more embodiments described herein.

FIG. 4 illustrates a block diagram of an example, non-limiting system 100 facilitating landing on emergency or unprepared landing strip in low visibility condition including an augment component 402 in accordance with one or more embodiments described herein. Repetitive description of like elements employed in other embodiments described herein is omitted for sake of brevity. Augment component 402 can augment the navigation database with the terrain data or the botanical data. Machine vision component 302 can utilize images captured by sensors 306 and employ machine learning 304 or artificial intelligence to analyze the images for terrain data or botanical data that can include structures, trees, mobile objects, etc. These terrain data or botanical data can be used to augment a navigation database onboard with an overlay of the additional data. Permanent fixtures or structures and trees can also be used to update a navigation database.

Figure 5:
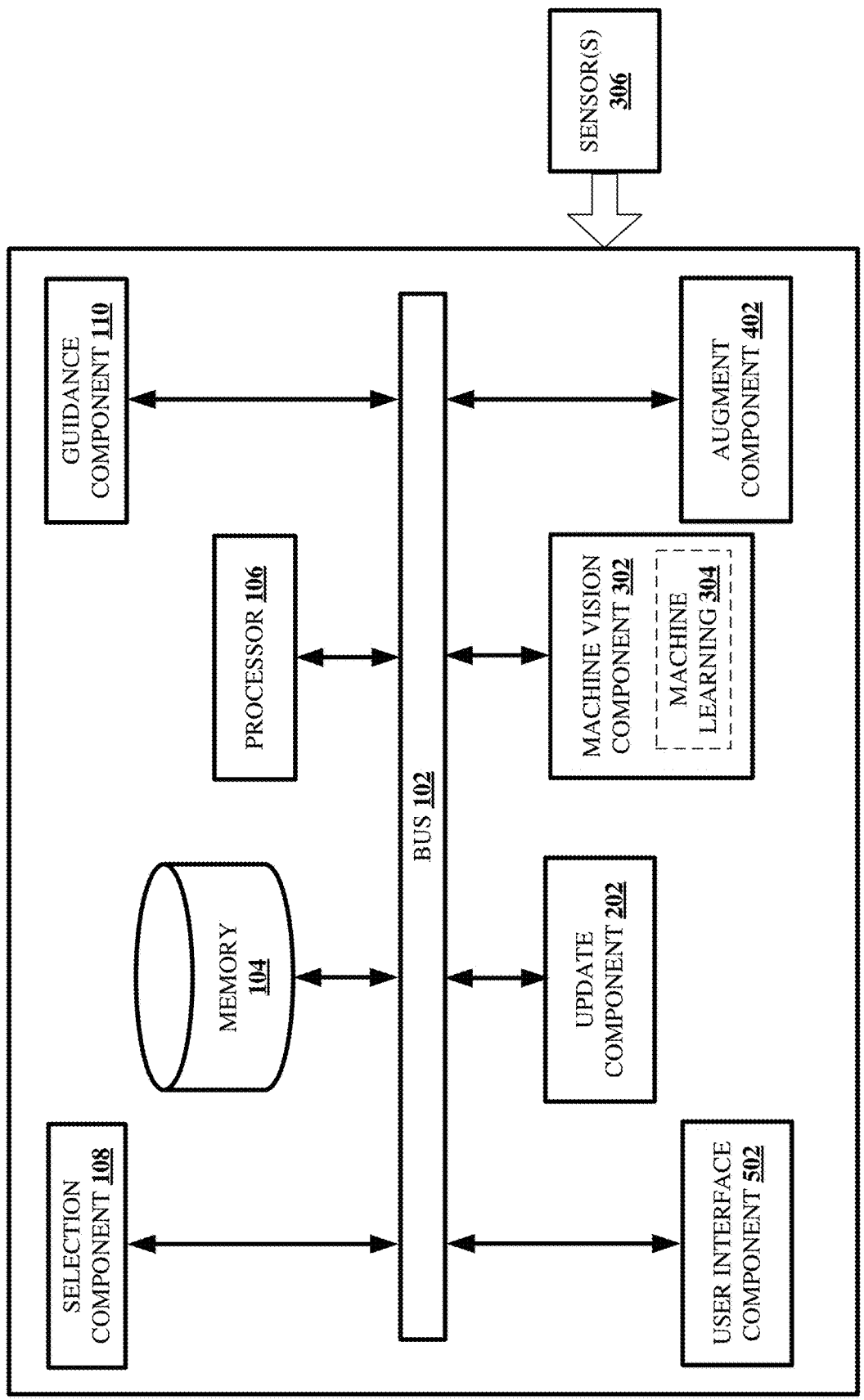
FIG. 5 illustrates a block diagram of an example, non-limiting system facilitating landing on emergency or unprepared landing strip in low visibility condition including a user interface component in accordance with one or more embodiments described herein.

FIG. 5 illustrates a block diagram of an example, non-limiting system 100 facilitating landing on emergency or unprepared landing strip in low visibility condition including a user interface component 502 in accordance with one or more embodiments described herein. Repetitive description of like elements employed in other embodiments described herein is omitted for sake of brevity. User interface component 502 can present to a pilot the selected (e.g., via selection component 108) candidate spaces for selection of a landing space. The selected candidate spaces can be presented with rankings based on suitability for landing and analytical data supporting the rankings. Pilots can employ user interface component 502 to select a landing strip among the presented candidate spaces for landing or choose to have selection component 108 select a landing strip. It is appreciated that if the aircraft can detect that a pilot is not available (e.g., inactivity, empty seat, etc.), selection component 108 can automatically select a landing strip, and the aircraft can go into autopilot with guidance component 110 guiding the aircraft to landing. If after a period of time has passed, selection component 108 can also determine that a selection has not been made and automatically select a landing strip.

Figure 6:
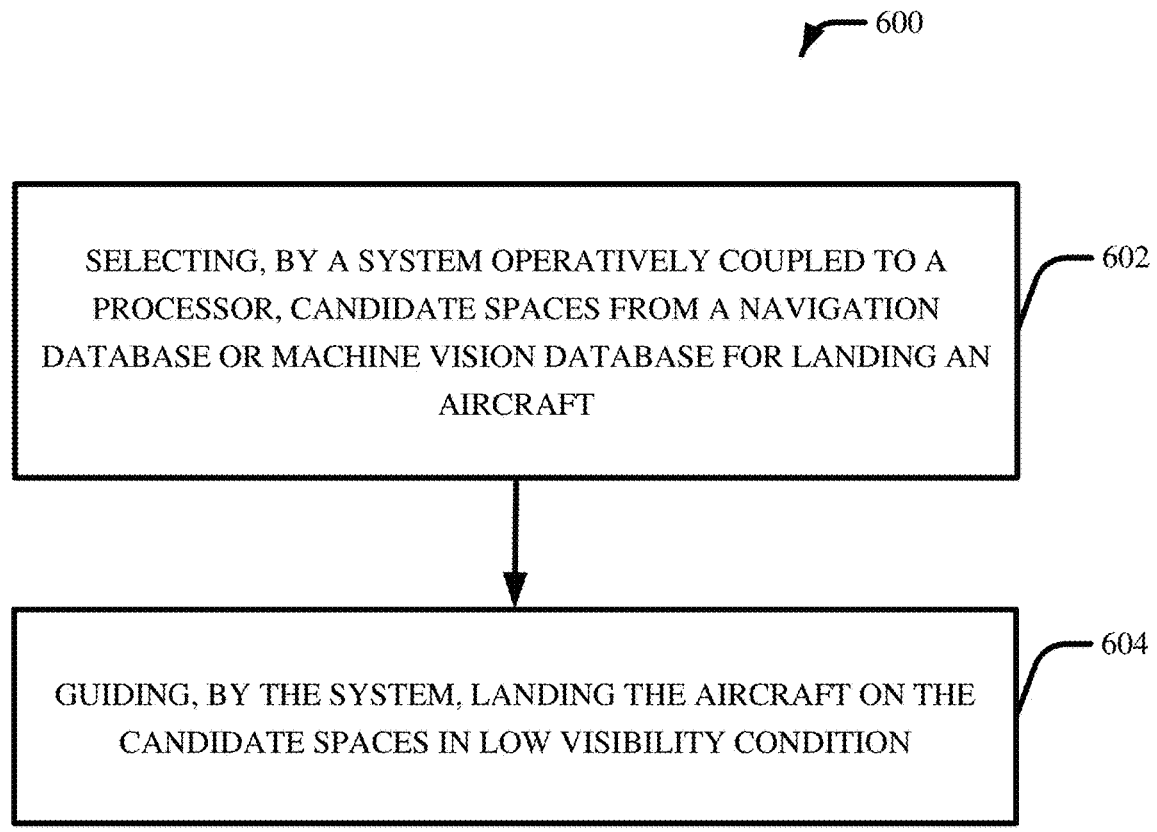
FIGS. 6-8 illustrate block diagrams of example, non-limiting computer-implemented methods facilitating landing on emergency or unprepared landing strip in low visibility condition in accordance with one or more embodiments described herein.

FIG. 6 illustrates a block diagram of an example, non-limiting computer-implemented method 600 facilitating landing on emergency or unprepared landing strip in low visibility condition in accordance with one or more embodiments described herein. Repetitive description of like elements employed in other embodiments described herein is omitted for sake of brevity. At 602, computer-implemented method 600 can comprise selecting (e.g., via selection component 108), by a system operatively coupled to a processor, candidate spaces from a navigation database or machine vision data for landing an aircraft. At 604, computer-implemented method 600 can comprise guiding (e.g., via guidance component 110), by the system, landing the aircraft on the candidate spaces in low visibility condition.

Figure 7:
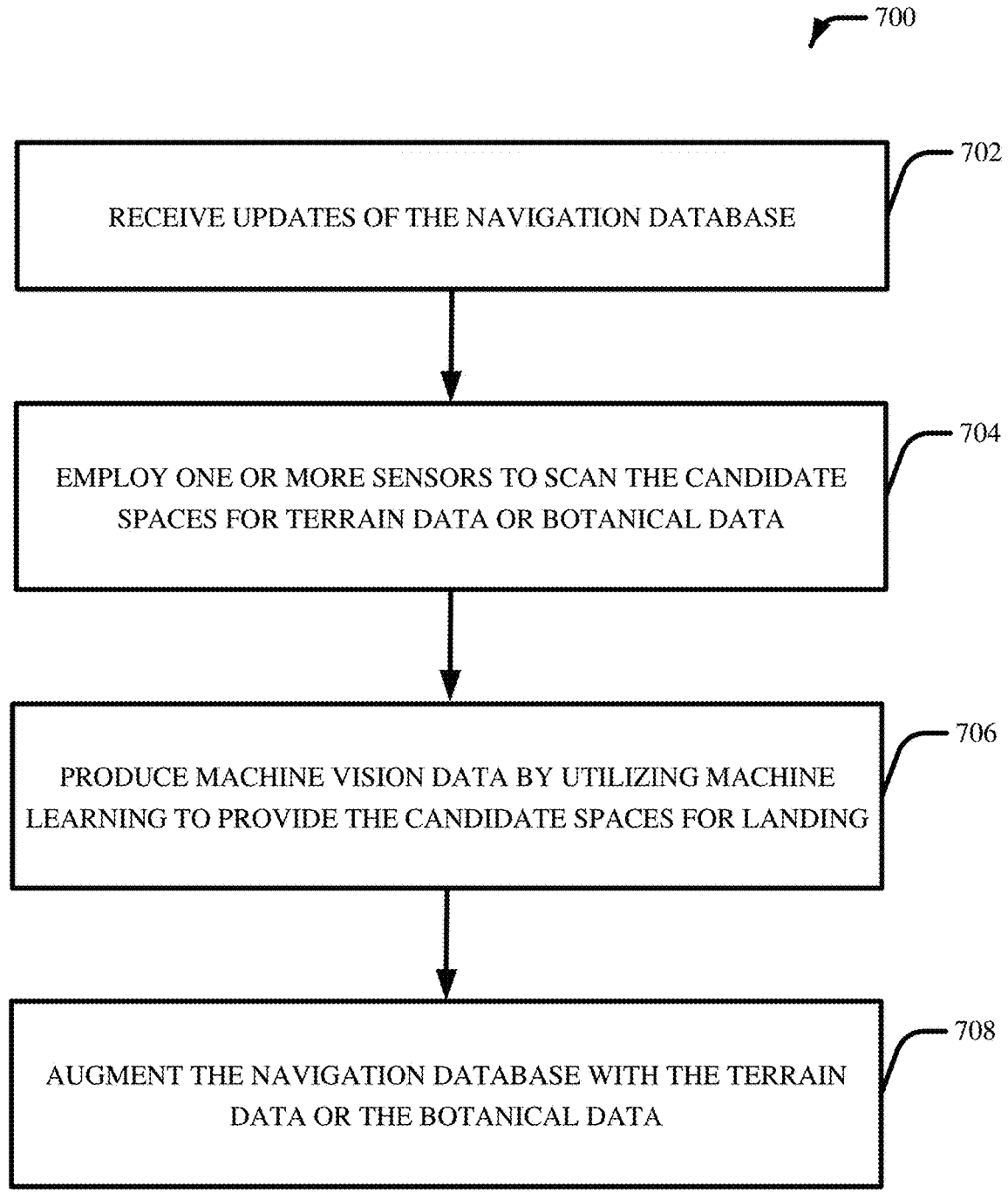

FIG. 7 illustrates a block diagram of an example, non-limiting computer-implemented method 700 facilitating landing on emergency or unprepared landing strip in low visibility condition in accordance with one or more embodiments described herein. Repetitive description of like elements employed in other embodiments described herein is omitted for sake of brevity. At 702, computer-implemented method 702 can comprise receiving (e.g., via update component 202) updates of the navigation database. At 704, computer-implemented method 700 can comprise employing (e.g., via machine vision component 302) one or more sensors to scan the candidate spaces for terrain data or botanical data. At 706, computer-implemented method 700 can comprise producing (e.g., via machine vision component 302) machine vision data by utilizing machine learning (e.g., 304) to provide the candidate spaces for landing. At 708, computer-implemented method 700 can comprise augmenting (e.g., via augment component 402) the navigation database with the terrain data or the botanical data.

Figure 8:
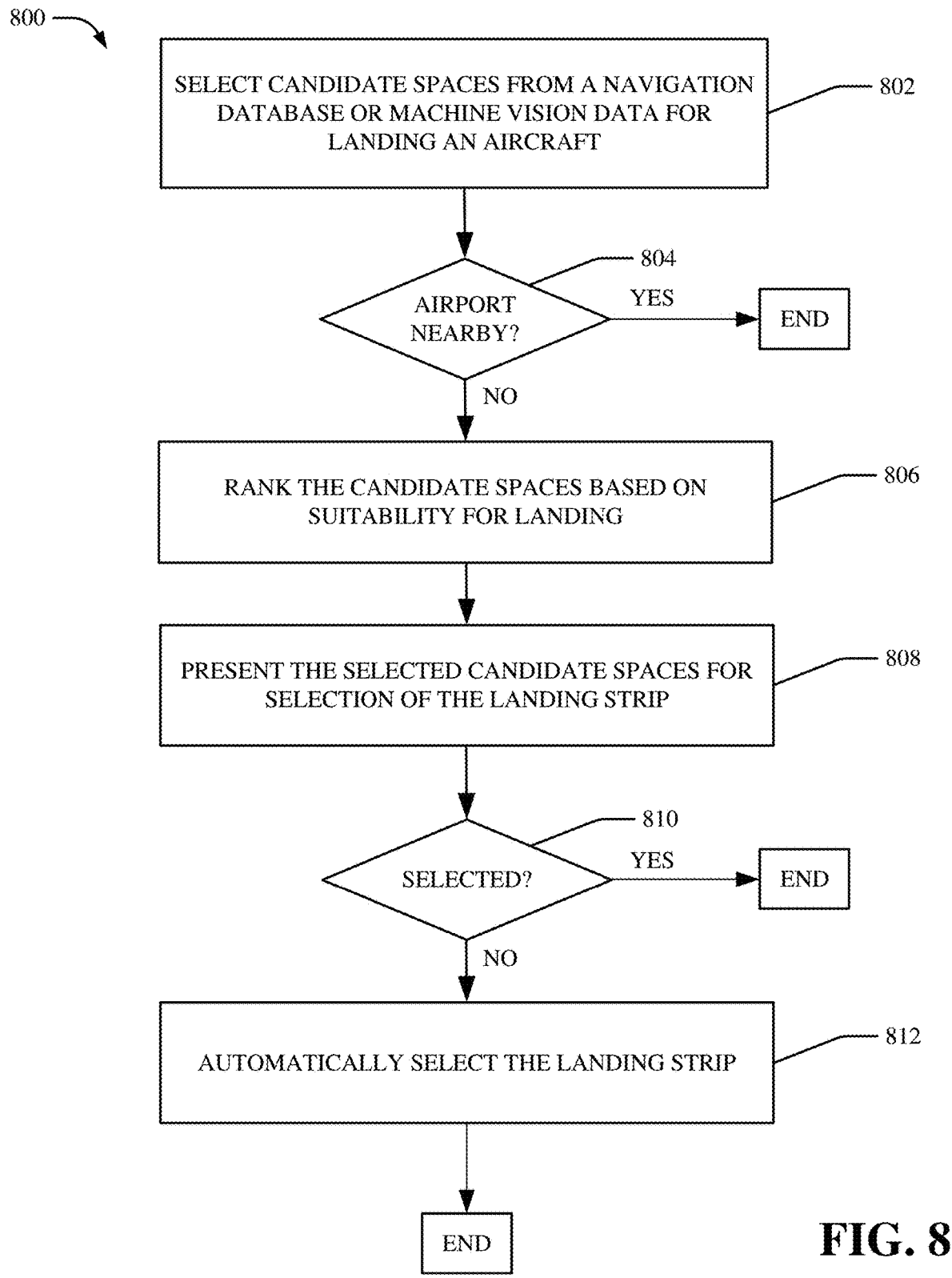

FIG. 8 illustrates a block diagram of an example, non-limiting computer-implemented method 800 facilitating landing on emergency or unprepared landing strip in low visibility condition in accordance with one or more embodiments described herein. Repetitive description of like elements employed in other embodiments described herein is omitted for sake of brevity. At 802, computer-implemented method 800 can comprise selecting (e.g., via selection component 108) candidate spaces from a navigation database or machine vision data for landing an aircraft. At 804, computer-implemented method 800 can comprise determining (e.g., via selection component 108) whether there is a suitable airport nearby (e.g., a short runway may be more hazardous than landing in a field) within available or remaining performance of the aircraft (e.g., if the aircraft is gliding, whether there is enough altitude to glide and land on the suitable runway). If yes, searching ends. If no, the process proceeds to 806. At 806, computer-implemented method 800 can comprise ranking (e.g., via selection component 108) the candidate spaces based on suitability for landing. At 808, computer-implemented method 800 can comprise presenting (e.g., via user interface component 502) the selected candidate spaces for selection of the landing strip. At 810, computer-implemented method 800 can comprise determining (e.g., via selection component 108) whether a landing strip has been selected. If yes, searching ends. If no, the process proceeds to 812. At 812, computer-implemented method 800 can comprise automatically selecting the landing strip.

Figure 9:
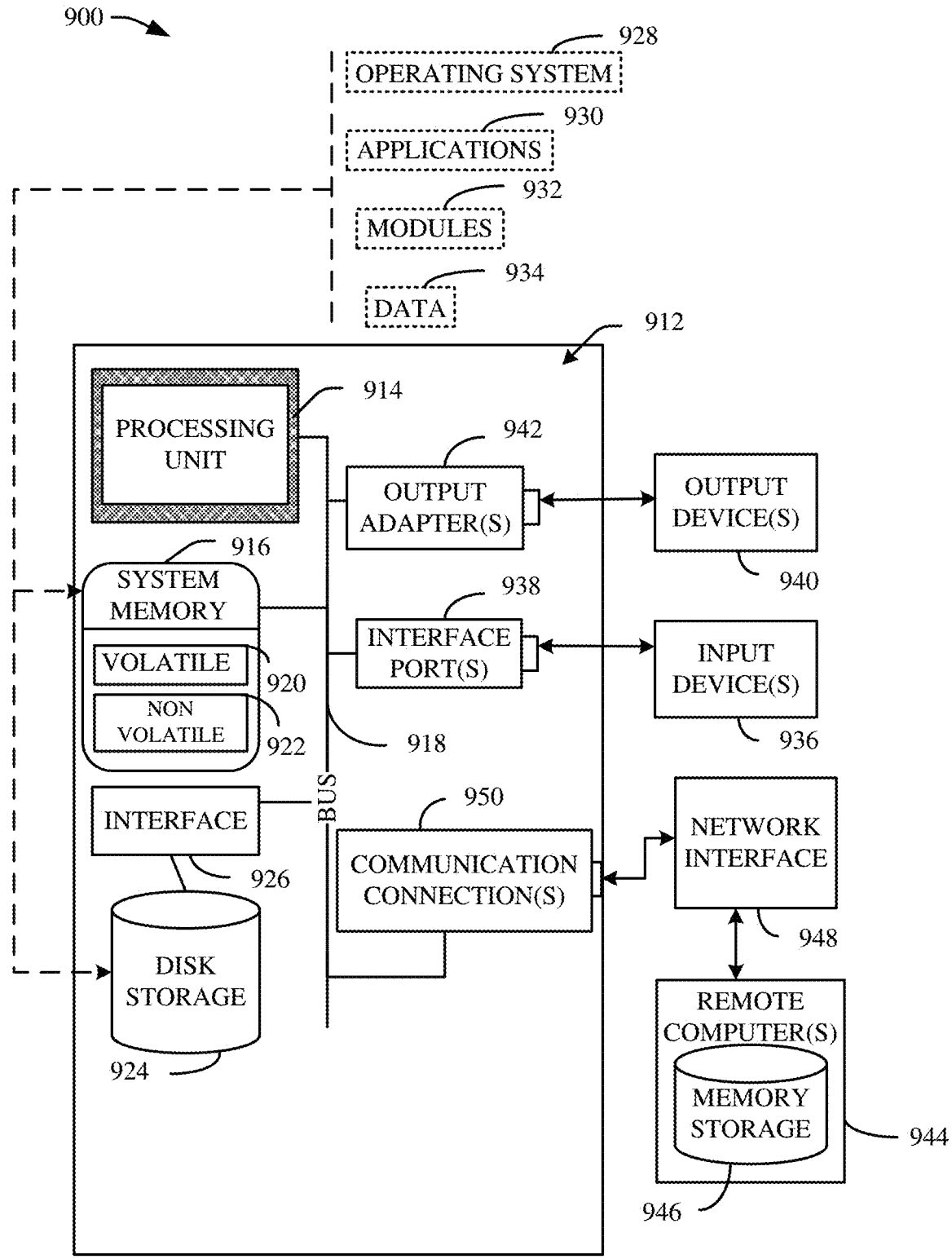
FIG. 9 illustrates a block diagram of an example, non-limiting operating environment in which one or more embodiments described herein can be facilitated.

To provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity.

With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 916 can also include volatile memory 920 and nonvolatile memory 922. The basic input/output system (BIOS), containing the basic routines to transfer information between elements within the computer 912, such as during start-up, is stored in nonvolatile memory 922. Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media. To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912.

System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc., that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
  a memory that stores computer executable components;
  a processor, operably coupled to the memory, and that executes computer executable components stored in the memory, wherein the computer executable components comprise:
    a selection component configured to:
      select candidate spaces from a navigation database or machine vision data for landing an aircraft, present the selected candidate spaces to a pilot of the aircraft, and responsive to a detection that the pilot of the aircraft is unavailable, automatically select a space for landing the aircraft from among the candidate spaces; and a guidance component configured to:

responsive to selection by the pilot of a landing strip from the presented candidate spaces, guide landing the aircraft on the pilot-selected landing strip in low visibility condition by providing a required attitude and glide angle for the aircraft to follow, and responsive to the detection that the pilot of the aircraft is unavailable, switch aircraft operation to autopilot to automatically guide the aircraft to landing at the automatically selected space.

2. The system of claim 1, further comprising an update component that receives updates of the navigation database.

3. The system of claim 1, further comprising a machine vision component that produces machine vision data by utilizing machine learning to provide the candidate spaces for landing.

4. The system of claim 3, wherein the machine vision component further employs one or more sensors to scan the candidate spaces for terrain data or botanical data.

5. The system of claim 4, wherein the one or more sensors utilize at least one of: lidar, radar or optics.

6. The system of claim 4, further comprising an augment component that augments the navigation database with the terrain data or the botanical data.

7. The system of claim 1, wherein the selection component also ranks the candidate spaces based on suitability for landing.

8. The system of claim 7, wherein the suitability for landing depends on aircraft speed, aircraft weight, wind direction, surface incline, field condition or surface condition.

9. The system of claim 1, further comprising a user interface component that presents the selected candidate spaces for selection of the landing strip.

10. A computer-implemented method, comprising:

selecting, by a system operatively coupled to a processor, candidate spaces from a navigation database or machine vision data for landing an aircraft;

presenting, by the system, the selected candidate spaces to a pilot of the aircraft;

responsive to a detection that the pilot of the aircraft is unavailable, automatically selecting, by the system, a space for landing the aircraft from among the candidate spaces; and switching, by the system, aircraft operation to autopilot to automatically guide the aircraft to landing at the automatically selected space.

11. The computer-implemented method of claim 10, further comprising receiving, by the system, updates of the navigation database.

12. The computer-implemented method of claim 10, further comprising producing, by the system, machine vision data by utilizing machine learning to provide the candidate spaces for landing.

13. The computer-implemented method of claim 10, further comprising scanning, by the system using one or more sensors of the system, the candidate spaces for terrain data or botanical data.

14. The computer-implemented method of claim 13, further comprising augmenting, by the system, the navigation database with the terrain data or the botanical data.

15. The computer-implemented method of claim 10, further comprising presenting, by the system, the selected candidate spaces for selection of a landing strip.

16. A computer program product for facilitating landing on emergency or unprepared landing strip in low visibility condition, the computer program product comprising a non-transitory computer readable storage medium having program instructions embodied therewith, the program instructions executable by a processor to cause the processor to:

select candidate spaces from a navigation database or machine vision data for landing an aircraft;

present the selected candidate spaces to a pilot of the aircraft;

responsive to a detection that the pilot of the aircraft is unavailable, automatically select a space for landing the aircraft from among the candidate spaces;

responsive to selection by the pilot of a landing strip from the presented candidate spaces, guide landing the aircraft on the pilot-selected landing strip by providing a required attitude and glide angle for the aircraft to follow; and responsive to the detection that the pilot of the aircraft is unavailable switch aircraft operation to autopilot to automatically guide the aircraft to landing at the automatically selected space.

17. The computer program product of claim 16, wherein the program instructions are further executable to cause the processor to:

receive updates of the navigation database.

18. The computer program product of claim 16, wherein the program instructions are further executable to cause the processor to:

produce machine vision data by utilizing machine learning to provide the candidate spaces for landing.

19. The computer program product of claim 16, wherein the program instructions are further executable to cause the processor to:

scan the candidate spaces for terrain data or botanical data.

20. The computer program product of claim 19, wherein the program instructions are further executable to cause the processor to:

augment the navigation database with the terrain data or the botanical data.

* * * * *